US008468517B2

(12) United States Patent
Helman et al.

(10) Patent No.: US 8,468,517 B2
(45) Date of Patent: *Jun. 18, 2013

(54) CONCURRENT UPGRADE OF ALL COMPONENTS IN STORAGE SUBSYSTEMS

(75) Inventors: Haim Helman, Tel Aviv (IL); Kariel Sandler, Tel Aviv (IL); Shemer Schwartz, Tel Aviv (IL); Moshe Yanai, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,346

(22) Filed: Apr. 19, 2012

(65) Prior Publication Data

US 2012/0210314 A1 Aug. 16, 2012

Related U.S. Application Data

(63) Continuation of application No. 12/481,963, filed on Jun. 10, 2009.

(51) Int. Cl.
*G06F 9/45* (2006.01)
(52) U.S. Cl.
USPC .......................................................... 717/171

(58) Field of Classification Search
USPC ......................................................... 717/171
See application file for complete search history.

(56) References Cited

U.S. PATENT DOCUMENTS

| 6,362,779 | B1 * | 3/2002 | Meek et al. ............... 342/357.77 |
| 7,568,125 | B2 * | 7/2009 | Kurapati et al. ............. 714/6.32 |
| 8,099,727 | B2 * | 1/2012 | Bahat et al. .................... 717/168 |
| 2006/0149994 | A1 * | 7/2006 | Kurapati et al. .................. 714/4 |
| 2008/0005733 | A1 * | 1/2008 | Ramachandran et al. .... 717/168 |
| 2008/0301663 | A1 * | 12/2008 | Bahat et al. .................... 717/170 |
| 2010/0131859 | A1 * | 5/2010 | Ferris et al. .................... 715/751 |
| 2012/0210314 | A1 * | 8/2012 | Helman et al. ................ 717/171 |

* cited by examiner

*Primary Examiner* — John Chavis
(74) *Attorney, Agent, or Firm* — Griffiths & Seaton PLLC (57) ABSTRACT

A plurality of upgraded components associated with an upgraded storage subsystem replaces a plurality of existing components associated with an existing storage subsystem. Support for a verify I/O command is created. A target volume is created in the upgraded storage subsystem having a same volume identification as a source volume. For a command received on the at least one of the plurality of upgraded components, the verify I/O command is invoked on at least one of a comparable one of the plurality of existing components. If the command is verified, the command is driven. The at least one of the plurality of upgraded components disguises a true volume identification of the target volume from the at least one of the plurality of existing components.

11 Claims, 5 Drawing Sheets

CONCURRENT UPGRADE OF ALL COMPONENTS IN STORAGE SUBSYSTEMS

CROSS REFERENCE TO RELATED APPLICATIONS

The present application is a Continuation of U.S. patent application Ser. No. 12/481,963, filed on Jun. 10, 2009.

FIELD OF THE INVENTION

The present invention relates in general to computers, and more particularly to a method, system, and computer program product for concurrent upgrade of data processing computer storage subsystems.

DESCRIPTION OF THE RELATED ART

Current computing environments provide for mechanisms to upgrade various components of the respective environment. For example, a data processing storage subsystem may provide for a mechanism to upgrade particular components of the subsystem, such as certain hardware parts. In addition, mechanisms may be provided for such upgradeability of a component through a software update. In a best-case scenario, the subsystem may provide for an operating system replacement, adapter firmware replacement, or disk firmware replacement at any one time. While this upgradability is desirable and even necessary in some cases, the current mechanisms present several limitations.

Some limitations described above include any or all of following exemplary limitations. First, many of the hardware components of the subsystem may be physically replaced with the exception of a backplane, midplane, or rack. A particular upgrade may require third party virtualization hardware. Finally, a particular upgrade may require third party, host-side migration software. In short, there is no current mechanism in place for a user to completely and concurrently upgrade all components (e.g., hardware, software, and firmware) in a computing environment such as a data processing storage subsystem at one single point in time, without the use of third-party software and/or third-party hardware.

SUMMARY OF THE INVENTION

In view of the foregoing, a need exists for a mechanism by which an entirety of components in a computing environment such as a data processing storage subsystem (including the aforementioned hardware, software, and firmware) may be upgraded in a single concurrent operation without the accompanying limitations described above. Accordingly, as will be more thoroughly described in detail, following, exemplary method embodiments are provided for concurrent upgrade of a plurality of components in a storage subsystem. Pursuant to such a concurrent upgrade, a plurality of upgraded components associated with an upgraded storage subsystem replaces a plurality of existing components associated with an existing storage subsystem. Further pursuant to the concurrent upgrade, at least one of the plurality of upgraded components is connected to at least one of the plurality of existing components.

In one such exemplary embodiment, by way of example only, support for a verify I/O command is created to be operable on the upgraded storage subsystem. A target volume is created in the upgraded storage subsystem having a same volume identification as a source volume in the existing storage subsystem. For a command received on the at least one of the plurality of upgraded components, the verify I/O command is invoked on at least one of a comparable one of the plurality of existing components to verify the command. If the command is verified, the command is driven. Pursuant to creating the target volume having the same volume identification as the source volume, the at least one of the plurality of upgraded components disguises at least one of a true volume and port identification of the target volume from the at least one of the plurality of existing components.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for data migration and/or concurrent upgrade of an entirety of components in a computing environment such as a data processing storage subsystem. In one exemplary embodiment, the totality of components in an existing storage controller is upgraded/replaced by an upgraded totality of components in an upgraded storage controller. In an additional embodiment, data is migrated between storage controllers over a network. With particular application to a storage controller implementation, the illustrated embodiments may take advantage of so-called "host multipathing" (e.g., a number of input/output (I/O) paths between a particular host and the storage controller) to temporarily split such I/O paths between an existing storage controller and an upgraded storage controller. In addition to leveraging host multipathing, the illustrated embodiments may also implement proprietary I/O commands to communicate locking requirements between new and old systems.

As will be seen, using such host multipathing and I/O commands, the mechanisms provided in the illustrated embodiments allow for a single operation to concurrently upgrade the totality of components. For example, the mechanisms provide for replacement of an entire clustered storage controller subsystem (for clustered hosts using reserve/release operations), including all hardware, software, operating systems, firmware, rack, midplane, backplane, and the like.

Such replacement may be performed without the need for third party tools such as virtualization mechanisms, and without the use of host-side migration software. Additional embodiments provide for data migration "online" using a network connecting the components without the need for physical placement of I/O paths or movement of components.

Figure 1:
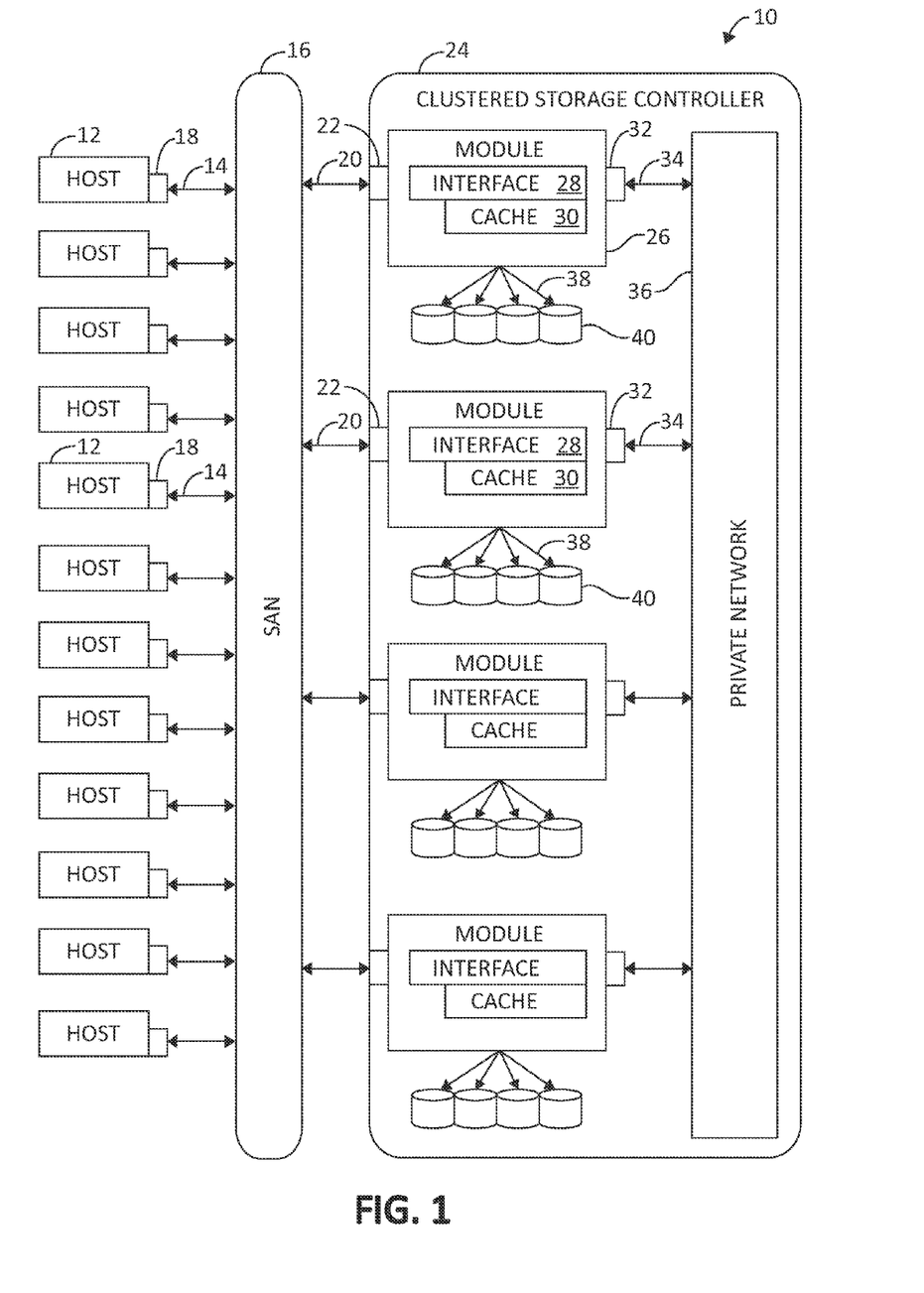
FIG. 1 is a block diagram of an exemplary computing environment including a data processing storage subsystem in which various aspects of the following description and claimed subject matter may be implemented.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other storage subsystems with diverse architectures and capabilities.

The storage subsystem 10 receives, from one or more host computers 12, I/O requests, which are commands to read or write data at logical addresses on logical volumes. Any number of host computers 12 are coupled to the storage subsystem 10 by any means known in the art, for example, using a network. Herein, by way of example, the host computers 12 and the storage subsystem 10 are assumed to be coupled by a storage area network (SAN) 16 incorporating data connections 14 and host bus adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and a private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference.

Each set of physical storage comprises multiple slow and/ or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30 and disks 40.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted, as explained in further detail herein below.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In other implementations the HBAs 18 may be directly coupled to the storage modules.

Data having contiguous logical addresses are generally distributed among the disks 40. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Figure 2:
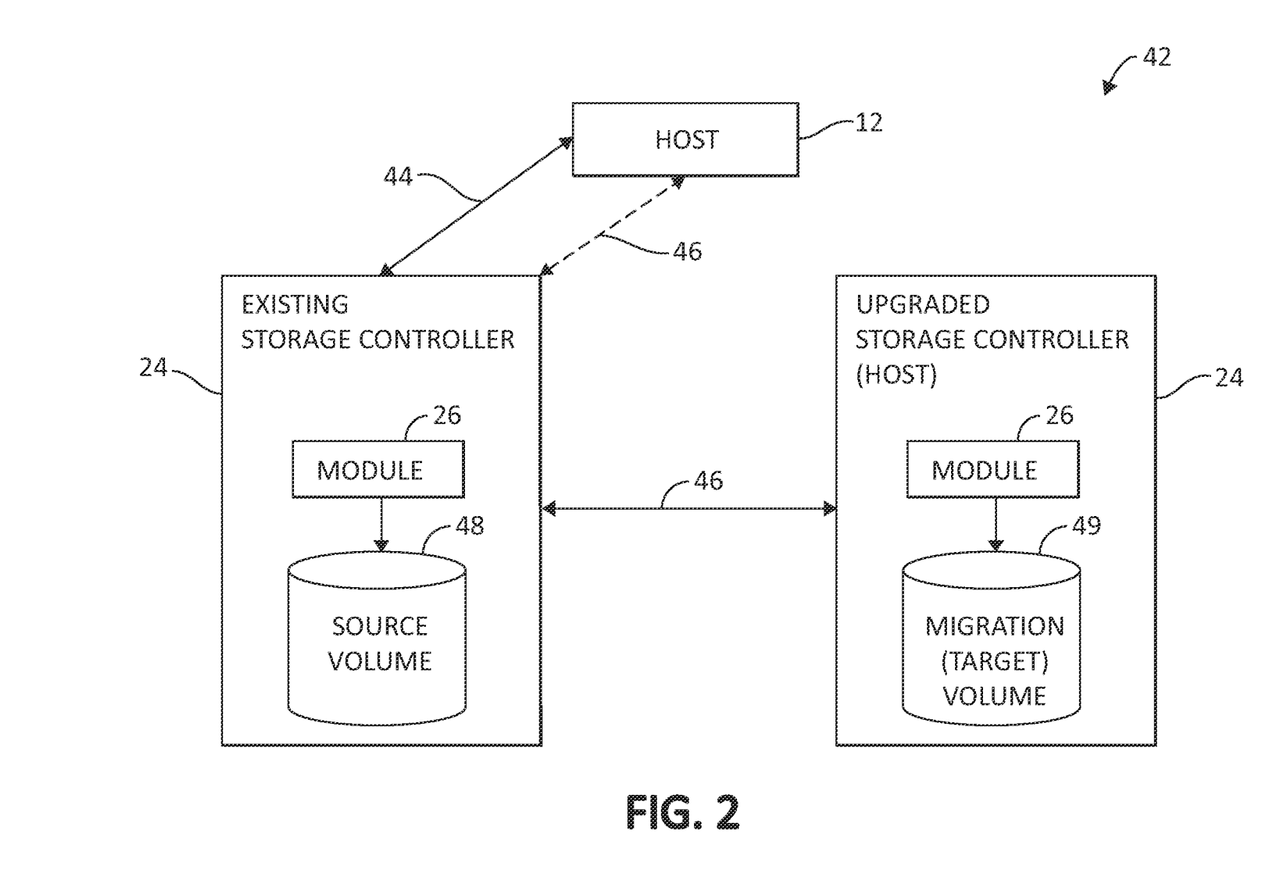
FIG. 2 is an additional block diagram of an exemplary mechanism for upgrading an entirety of components in an existing clustered data storage controller to an upgraded entirety of components in an upgraded clustered data storage controller.

Turning to FIG. 2, following, reference is made to an additional block diagram depicting a mechanism 42 for data communication between one or more hosts 12 (such as a number of clustered hosts implementing reserve/release operations) and an existing storage controller 24 (including each of the subcomponents depicted previously in FIG. 1, such as storage module 26) and an upgraded storage controller 24 containing a number of upgraded components having a relationship to the existing components in the existing storage controller 24. The existing storage controller 24 uses multipathing mechanisms to provide several I/O paths between the host 12 and the existing storage controller 24. Two of such I/O paths are depicted as paths 44 and 46.

Figure 4A:
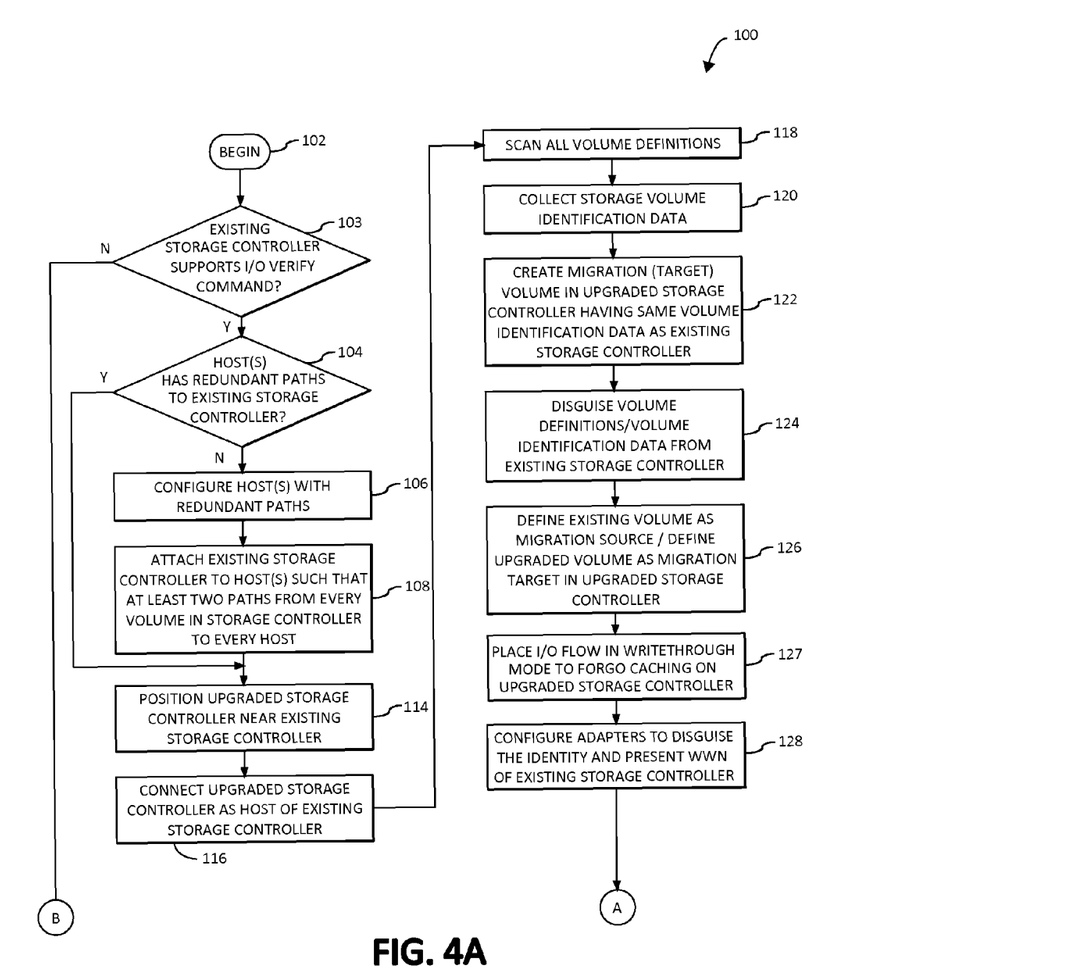
FIGS. 4A and 4B illustrate a flow chart diagram of an exemplary method for concurrent upgrade of a plurality of components in a storage subsystem.
Figure 4B:
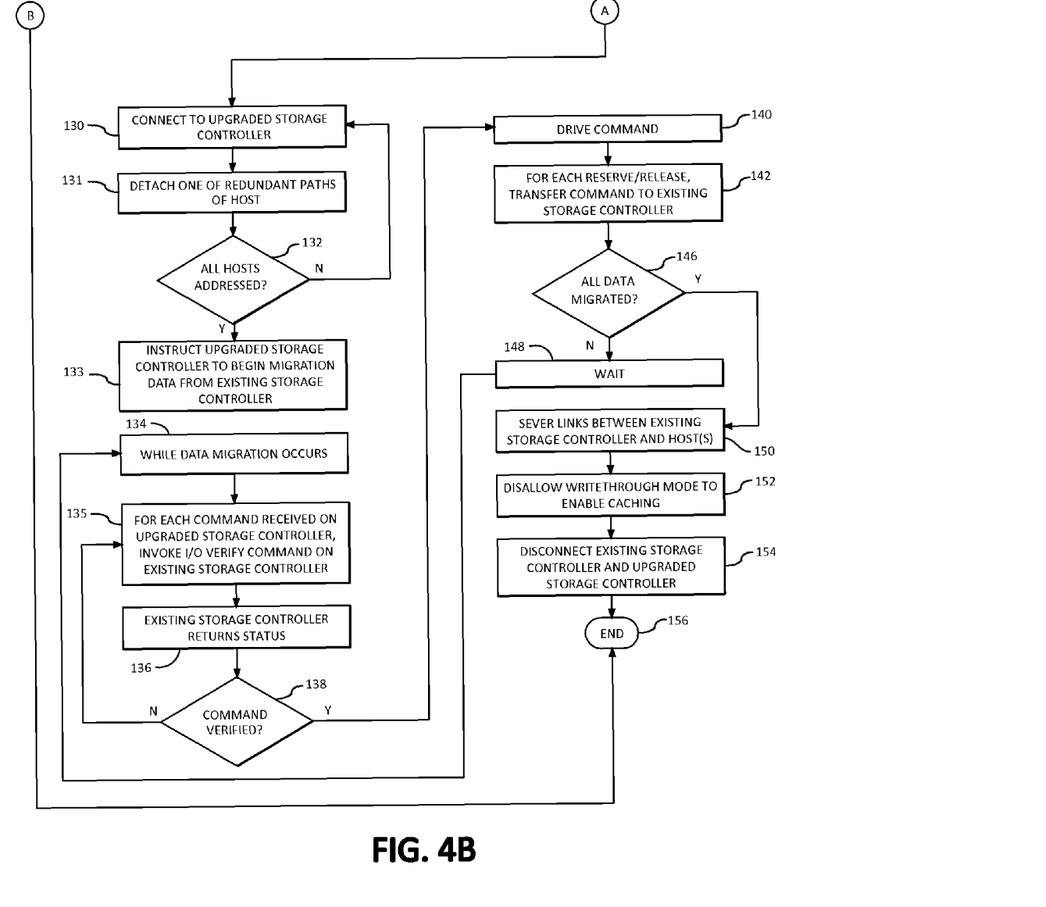

For the mechanisms of the present invention to properly operate, at least two paths, such as paths 44 and 46 must exist from every logical volume in the storage controller 24 to the host 12. One of the two paths, such as path 44 is subsequently used to connect to a comparable logical volume in the upgraded storage controller 24. In this way, a source volume 48 is established in the existing storage controller which is connected to a migration (target) volume 49 in the upgraded storage controller 24, and the upgraded storage controller 24 is established as an additional host to the existing storage controller 24. Method 100 in FIG. 4, following, describes this process in additional detail.

Figure 3:
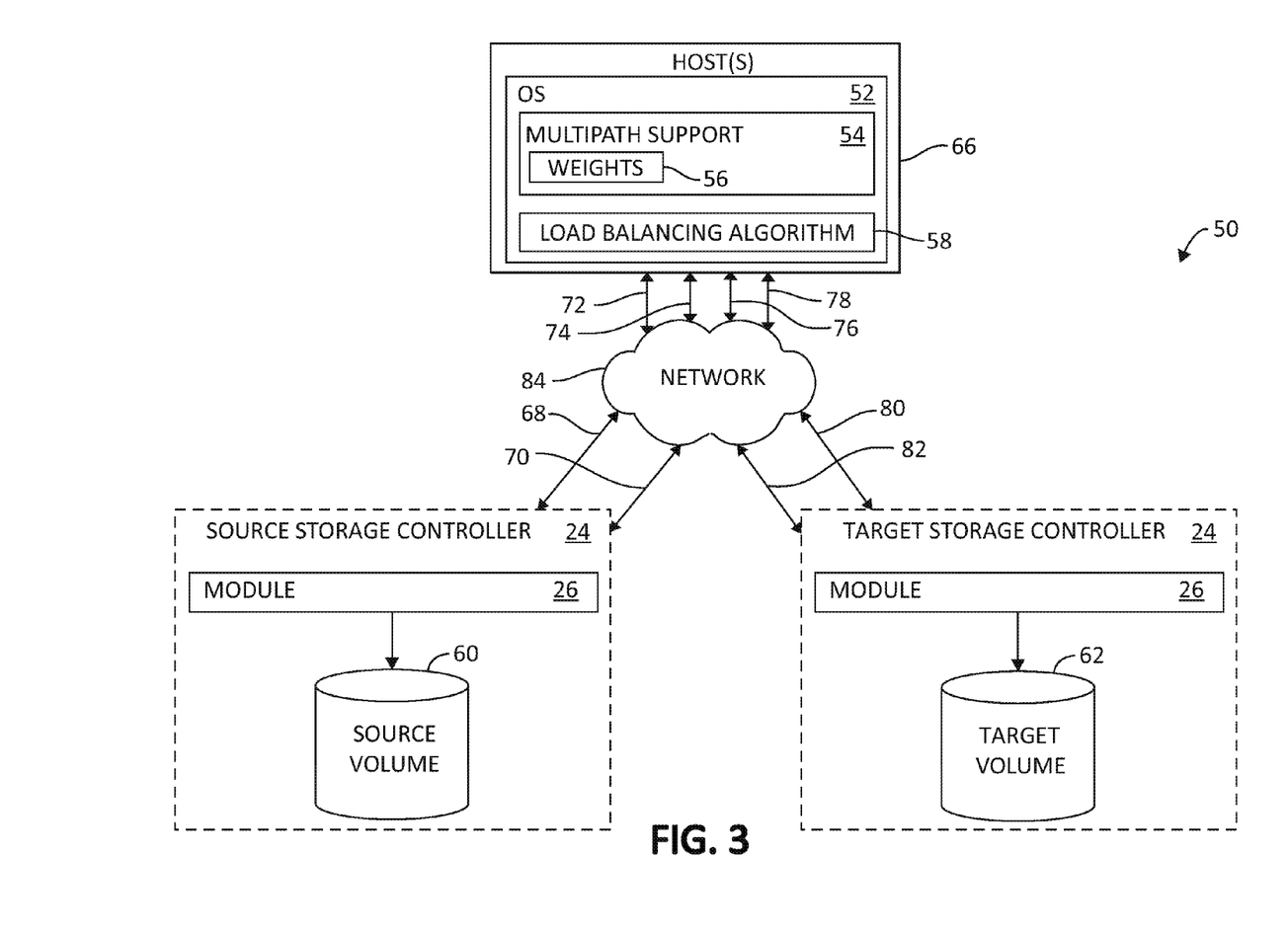
FIG. 3 is an additional block diagram of an exemplary mechanism for data migration between storage controllers over a network incorporating multipathing support.

Turning to FIG. 3, following, reference is made to an additional block diagram depicting a mechanism 50 for data migration between two storage controllers 24 over a network 84. Here as in FIG. 2, previously, a source storage controller 24 uses multipathing mechanisms to provide several I/O paths between the host(s) 66 and the source storage controller. Two of such paths are denoted as paths 68 and 70 between network 84. Similarly, target storage controller 24 implements paths 80 and 82 between network 84. I/O paths 72, 74, 76, and 78 provide data connectivity for I/O paths 68, 70, 80, and 82 from the network 84 to the host(s) 66.

A host or hosts 66 is adapted with an operating system 52 (OS). The OS 52 includes multi-path support module 54 for providing multipath support to the storage controller 24. Requesting applications operable on hosts 66 do not realize that their I/Os are being sent via one I/O path or another, because the multipath support presents the multiple paths as a single I/O path. Each multi-path support module 54 includes a number of multipath weights 56 which may be set by a system administrator. Multipath weights 56 may be assigned for each I/O path, for example for I/O paths 68 and 70. Based on the values assigned to the I/O paths, a particular I/O path may be favored or preferred over another I/O path. OS 52 also includes a load balancing algorithm 58 for determining along which of the I/O paths to transfer data. For example, based on particular bandwidth or performance considerations, the OS may utilize load balancing algorithm 58 to implement a greater or smaller amount of data transfer along a particular I/O path. Hosts 66 may leverage I/O multipathing to perform data migration over network 84 from the source volume 62 to the target volume 64 as will be further described, following.

Turning to FIGS. 4A and 4B, following, an exemplary method 100 for concurrently upgrading an entirety of components in a computing environment is illustrated. Method 100 provides additional focus on the former example of upgrading the totality of components in a clustered storage controller previously described.

As one skilled in the art will appreciate, various steps in the method 100 may be implemented in differing ways to suit a particular application. In addition, the described method may be implemented by various means, such as hardware, software, firmware, or a combination thereof operational on or otherwise associated with the computing environment. For example, the method may be implemented at least partially as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with a determination (performed either manually or with the assistance of a computer diagnostic function) as to whether the existing storage controller supports an I/O verify command (step 103). The I/O VerifyCommand is configured as a proprietary I/O function. In a preferred embodiment, such command is created as a reserved small computer systems interface (SCSI) operation. The purpose of the verify command is to cross reference any I/O command that is received on an upgraded storage controller with a one or more comparable components in the existing storage controller for validation purposes. Such functionality will be further explained, following. If a determination is made that such command is not presently supported, the then method 100 ends (step 156).

If a determination is made that the command is supported, then the method 100 moves to step 104, which queries (again, either manually or by processor/software assistance or automatically by the storage controller) whether a particular host or hosts has redundant I/O paths sufficient to provide the upgrade functionality as previously described. In addition, one or more storage controllers themselves may make such a determination. If such a determination is not made, then the host may be configured with such redundant paths as necessary to establish at least two I/O paths between itself and each logical volume (step 106). This step must be performed for each host. Method 100 then moves to step 108, in which the existing storage controller is attached to the host such that at least two paths are established as previously described (again for each host). If the determination in step 104 is made that the host(s) is preconfigured, the method 100 moves to step 114 as will be described, following.

In step 114, a user positions an upgraded storage controller (replacement storage controller) unit near the existing storage controller. The upgraded controller is connected and configured as a host of the existing storage controller (step 116) by using one of the redundant I/O paths originally connecting the host and the existing storage controller. Once the upgraded storage controller is connected, the upgraded controller scans the existing controller for volume definition data (step 118), and collects storage volume identification data (step 120), such as world wide name (WWN) information associated with each volume.

One or more migration (target) volumes are then created in the upgraded storage controller. In a typical implementation, hundreds of such volumes are created. The target volume is configured with the same volume identification (again, such as the WWN) of the corresponding source volumes in the existing storage controller (step 122). In conjunction with this operation, the upgraded storage controller invokes a mechanism on interfaces 22 (from FIG. 1) to disguise the true identity (true volume and port identification) of the target volume and target port from interconnected components in the existing storage controller (step 124).

As a following step, the existing volume in the existing controller is formally defined as the source volume for I/O migration purposes, and the upgraded volume is formally defined as the target volume in the upgraded controller (step 126). This series of steps is performed for all volumes of the existing storage controller. The I/O flow to the upgraded storage controller is placed in a writethrough mode to forego caching (step 127).

As a next step, the adapters on the upgraded storage controller are configured to disguise the identity and present WWN of the existing storage controller (step 128). Turning to the following sheet 5, FIG. 4 continues in step 130 as the user connects a redundant I/O path to the upgraded storage controller (step 130) and then detaches one of the redundant paths from the old controller (step 131) so as to maintain at least two points of access at all times. The method 100 then moves to step 132, which queries whether all hosts have been addressed in this manner. If not, then the connectivity steps described in steps 130, and 131 are repeated for each additional host. Once all hosts are addressed (again, step 132) the method 100 moves to step 133, where the upgraded storage controller is instructed to begin migrating data from the existing storage controller.

While data is migrating between the existing and upgraded storage controllers (step 134), and for each command received on the upgraded storage controller, the I/O Verify-Command function is invoked on the existing storage controller to provide verification of parameters such as command descriptor block (CDB) data, host identification (host id) data, volume identification (volume id) data, etc. for a particular command received by the upgraded storage controller (step 135). The existing controller then returns a status to the upgraded storage controller (step 136). If the command is verified (step 138), the command is driven (step 140). If no, the method 110 returns to step 135 to receive an additional command.

For each reserve/release received on the upgraded storage controller, the command is transferred to the existing storage controller (step 142). The method 100 makes a determination as to whether all data has been migrated from the existing controller to the upgraded controller (step 146). If no, then the method waits (step 148) while data continues to be migrated (returning to step 134) and continues the process of processing/handling received commands as before (again, steps 134-142). Once all data has been determined to have been migrated, the server links between the existing storage controller and the host(s) are severed (step 150). The previously engaged writethrough mode is disengaged to re-enable caching (step 152). The existing storage controller is disconnected from the upgraded storage controller (step 154). The method 100 then ends (step 156).

The skilled artisan will appreciate that various steps in the foregoing method 100 may be adapted or changed for a particular implementation. Here again, the illustration of a computing environment including an existing and upgraded storage controllers is exemplary, and not intended to be limiting to the applicability of the foregoing mechanisms to other types of computer environments, systems, and subsystems.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for replacing an entirety of an existing storage subsystem with an upgraded storage system, and pursuant to the replacing, at least one upgraded component of a plurality of upgraded components making up the upgrade storage system is connected to at least one existing component of a plurality of existing components making up the existing storage system, the method comprising:
 creating support for a verify I/O command to be operable on the upgraded storage subsystem;
 creating a target volume in the upgraded storage subsystem having a same volume identification as a source volume in the existing storage subsystem;
 configuring a network port to have a same identification as a source port in the existing storage subsystem; and
 for a command received on the at least one of the plurality of upgraded components, invoking the verify I/O command on at least one of a comparable one of the plurality of existing components to verify the command, wherein if the command is verified, driving the command;
 wherein pursuant to creating the target volume having the same volume identification as the source volume, the at least one of the plurality of upgraded components disguises at least one of a true volume and port identification of the target volume from the at least one of the plurality of existing components by presenting at least one of a true volume and port identification of the source volume as the at least one of the true volume and port identification of the volume.

2. The method of claim 1, further including scanning at least one volume definition and collecting the same volume identification by the at least one of the plurality of upgraded components.

3. The method of claim 1, further including configuring the at least one of the comparable one of the plurality of existing components to support the verify I/O command.

4. The method of claim 1, further including, previous to the invoking the verify I/O command, placing at least one of the plurality of upgraded components in a writethrough mode to forgo a caching operation.

5. The method of claim 4, further including, subsequent to the driving the command, for a reserve/release command for one of the plurality of upgraded components, transferring the command to the at least one of the comparable one of the plurality of existing components.

6. The method of claim 5, further including determining that all data has been migrated from the plurality of existing components to the plurality of upgraded components.

7. The method of claim 6, further including, subsequent to the determining that all data has been migrated, disabling the writethrough mode to allow the caching operation.

8. A method for manufacturing a system for replacing an entirety of an existing storage subsystem with an upgraded storage system, comprising:

providing a plurality of existing components, at least one of the plurality of existing components being a device and the plurality of existing components included as part of the existing storage subsystem; and a plurality of upgraded components being connected to the at least one of the plurality of existing components, the plurality of upgraded components being another device, wherein the plurality of upgraded components is included as part of the upgraded storage system and at least one of the plurality of upgraded components is adapted for:

creating support for a verify I/O command to be operable on the upgraded storage subsystem, creating a target volume in the upgraded storage subsystem having a same volume identification as a source volume in the existing storage subsystem, for a command received on the at least one of the plurality of upgraded components, invoking the verify I/O command on at least one of a comparable one of the plurality of existing components to verify the command, wherein if the command is verified, driving the command, and pursuant to creating the target volume having a same volume identification as the source volume, disguising at least one of a true volume and port identification of the target volume from the at least one of the plurality of existing components by present at least one of a true volume and port identification of the source volume as the at least one of the true volume and port identification of the volume.

9. The method of manufacture of claim 8, wherein the at least one of the plurality of upgraded components is further adapted for scanning at least one volume definition and collecting the same volume identification.

10. The method of manufacture of claim 8, wherein the at least one of the comparable one of the plurality of existing components is configured to support the verify I/O command.

11. The method of manufacture of claim 8, wherein the one of the plurality of upgraded components is further adapted for, previous to the invoking the verify I/O command, placement in a writethrough mode to forgo a caching operation.

* * * * *